United States Patent [19]

Gerard et al.

[11] Patent Number: 5,974,428
[45] Date of Patent: Oct. 26, 1999

[54] METHOD AND APPARATUS FOR CLASS VERSION NAMING AND MAPPING

[75] Inventors: Scott N. Gerard; Steven J. Munroe, both of Rochester, Minn.

[73] Assignee: International Business Machines Corporation, Armonk, N.Y.

[21] Appl. No.: 08/920,456

[22] Filed: Aug. 29, 1997

[51] Int. Cl.$^6$ ........................................... G06F 17/30
[52] U.S. Cl. ................ 707/203; 707/204; 707/205; 345/340; 345/348; 714/38
[58] Field of Search ........................... 707/203, 204, 707/205, 103, 206; 395/183, 14, 702, 701, 705, 200; 345/348, 333, 340; 714/38

[56] References Cited

U.S. PATENT DOCUMENTS

| | | | |
|---|---|---|---|
| 5,404,525 | 4/1995 | Endicott et al. | 395/702 |
| 5,784,553 | 7/1998 | Kolawa et al. | 395/183 |
| 5,790,855 | 8/1998 | Faustini | 395/701 |
| 5,815,718 | 9/1998 | Tock | 395/705 |
| 5,842,020 | 11/1998 | Faustini | 395/701 |

*Primary Examiner*—Thomas G. Black
*Assistant Examiner*—Thu-Thao Havan
*Attorney, Agent, or Firm*—Derek P. Martin; S. Jared Pitts

[57] ABSTRACT

According to a preferred embodiment of the present invention, a class versioning and mapping system allows a user to request a desired class without knowing which class version is the most recent or correct version for the desired class. The class versioning and mapping system uses a version mapping mechanism to cross reference the requested class, select the most recent or best version of the requested class, and then return an object to the user that belongs to the selected class. This feature allows the system to have multiple versions of the same class on-line at the same time and use objects from different versions of the same class in a way that is transparent to the user. Therefore, by using a preferred embodiment of the present invention, a client object can specify or request that an object be created without having any knowledge of the actual class version or version(s) that are available.

41 Claims, 4 Drawing Sheets

```
# OldVersion=NewVersion

# map Employee classes
```
210 → ibm.as400.Employee=ibm.as400.Employee$2_0
220 → ibm.as400.Employee$1_1=ibm.as400Employee$2_0
```

```
230 → ibm.as400.Department=ibm.as400.Department$2_3
240 → ibmas400.Part=ibm.as400.Part$4_2
```

#completely rename a class
```
250 → ibm.as400.Apple=ibm.as400.Orange$3_7

FIG. 2

METHOD AND APPARATUS FOR CLASS VERSION NAMING AND MAPPING

BACKGROUND OF THE INVENTION

1. Technical Field

This invention generally relates to object-oriented programming and more specifically relates to an improved system for managing version changes for classes in object-oriented environments.

2. Background Art

The development of the EDVAC computer system of 1948 is often cited as the beginning of the computer era. Since that time, computer systems have evolved into extremely sophisticated devices, and computer systems may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems typically include operating system software that controls the basic function of the computer, and one or more software application programs that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the application software programs designed for high performance computer systems have become extremely powerful. Additionally, software development costs have continued to rise because more powerful and complex programs take more time, and hence more money, to produce.

One way in which the performance of application software programs has been improved while the associated development costs have been reduced is by using object-oriented programming concepts. The goal of using object-oriented programming is to create small, reusable sections of program code known as "objects" that can be quickly and easily combined and re-used to create new programs. This is similar to the idea of using the same set of building blocks again and again to create many different structures. The modular and re-usable aspects of objects will typically speed development of new programs, thereby reducing the costs associated with the development cycle. In addition, by creating and re-using a comprehensive set of well-tested objects, a more stable, uniform, and consistent approach to developing new computer programs can be achieved.

Another central concept in object-oriented programming is the "class." A class is a template or prototype that defines a type of object. A class outlines or describes the characteristics or makeup of objects that belong to that class. By defining a class, objects can be created that belong to the class without having to rewrite the entire definition for each new object as it is created. This feature of object-oriented programming promotes the reusability of existing object definitions and promotes more efficient use of code.

JAVA is the name of one very well-known and popular object-oriented computer programming language which is used to develop software applications. JAVA's popularity stems in part from its relative simplicity and the fact that JAVA is written in a manner that allows different computers (i.e., platforms) to execute the same JAVA code. In other words, JAVA is platform-independent. This feature has caused the use of JAVA to greatly increase with the growing popularity of the Internet, which allows many different type of computer platforms to communicate with each other.

Computer programs naturally evolve over time. The evolution of object-oriented computer programs entails defining new classes that have implementations different than previous versions. As time passes, the type and quantity of information stored by these objects may need to be changed or enhanced to accommodate additional or different data types. In this case, the definition of the class will, of necessity, be changed to support the new object data storage requirements. This scenario typically occurs when a program is upgraded from a first software version to a newer, more powerful version of the program. A new release of an existing program may use a combination of new classes and classes that were defined in a previous version. The processes and activities associated with modifying, updating, and tracking changes in a class over a period of time are known as "versioning."

It is important to note that, even though a program has been upgraded, it is frequently necessary to maintain both the existing objects that were created by the first version (belonging to one version of a class) and the new objects that are created by the newer version of the software application (belonging to a different version of the same class). In order to accomplish this, some mechanism should be provided to track the various names of the object classes as the versions of the software application are changed. Theoretically, it is possible to give each new class version the same name. However, in practice, JAVA requires that each new version of the class have a new name. This means that as time passes and multiple versions of the various classes are changed, it can become very difficult to keep track of the many different names for each class and the related objects that are created.

For example, a large company that has been in business for many years may have changed the nature of the object used to store employee-related data as the information needs of the business developed. Beginning in 1970, the employee object tracked the name, address, phone number, date of hire, supervisor, and salary for each employee. In 1980 the definition of the objects in the employee class was changed to include information regarding 401K plans for the employee and in 1990 the definition for the employee class was changed again to include information regarding each employee's performance and evaluation reviews.

There are several solutions that have been previously implemented to address the versioning problems associated with multiple names for different versions of the same class. Typically, when a new version of a software application is to be implemented, the software application is recompiled and the system must be shut down. When the new version of the software application is loaded, the system will recognize that a new version has been created, load all the existing objects, and rebuild the objects one by one so that they are compatible with the new version of the software application. This process may also include a re-naming of all existing objects. While this solution is acceptable for systems with a limited number of objects, once the number of objects in the system exceeds a certain minimal level, the operational overhead associated with rebuilding each object in the system every time the version changes can quickly become unacceptable.

Another possible solution is to create a sub-class for the new version of the objects as they are needed. This solution, while useful, has its own inherent limitations. Specifically, as each new version of the class is created, another level in the class hierarchy is established. After a period of time, tracking class versions through the nested hierarchy of classes and sub-classes becomes extremely inefficient and can measurably reduce system performance.

Without a mechanism for more easily and flexibly creating, managing, and tracking the various versions of object classes that must be utilized in a large-scale, frequently evolving object-oriented environment, the computer industry will continue to suffer from the effects of the inefficient versioning methods presently used to manage new class versions. In addition, the creation of objects according to the desired class version will continue to be more difficult and uncertain than necessary.

DISCLOSURE OF INVENTION

Ideally, there should be an unobtrusive or transparent way for a client object to request a new object and for the system to respond with the correct version of the class and/or to create a default version of the class if the exact version is relatively unimportant. It would be most desirable to provide a versioning solution which is completely transparent to the user and which can be implemented without any specialized knowledge on the part of the client objects. This abstracts the user from the details of the various versions of the classes and provides a desired object from the correct class with far greater regularity than is presently possible. Therefore, this invention provides an improved method and mechanism for tracking and managing the changing definitions and implementations of multiple class versions in an object-oriented environment.

According to a preferred embodiment of the present invention, a class versioning and mapping system allows a user to specify a desired class without knowing which version of the class is the most recent or correct version of the class. The class versioning and mapping system uses a version mapping mechanism to cross reference the requested class, select the most recent or best version of the requested class, and return an object to the user or requesting object that belongs to the appropriate class. This feature allows the system to have multiple versions of the same class on-line at the same time and to create and use objects from different versions of the same class. Therefore, by using a preferred embodiment of the present invention, a client object or user can specify or request that an object be created without necessarily having any knowledge of the actual class version or version(s) that are available.

BRIEF DESCRIPTION OF THE DRAWINGS

The preferred embodiments of the present invention will hereinafter be described in conjunction with the appended drawings, where like designations denote like elements, and:

FIG. 2 is a source listing for a version mapping mechanism according to a preferred embodiment of the present invention;

BEST MODE FOR CARRYING OUT THE INVENTION

Figure 1:
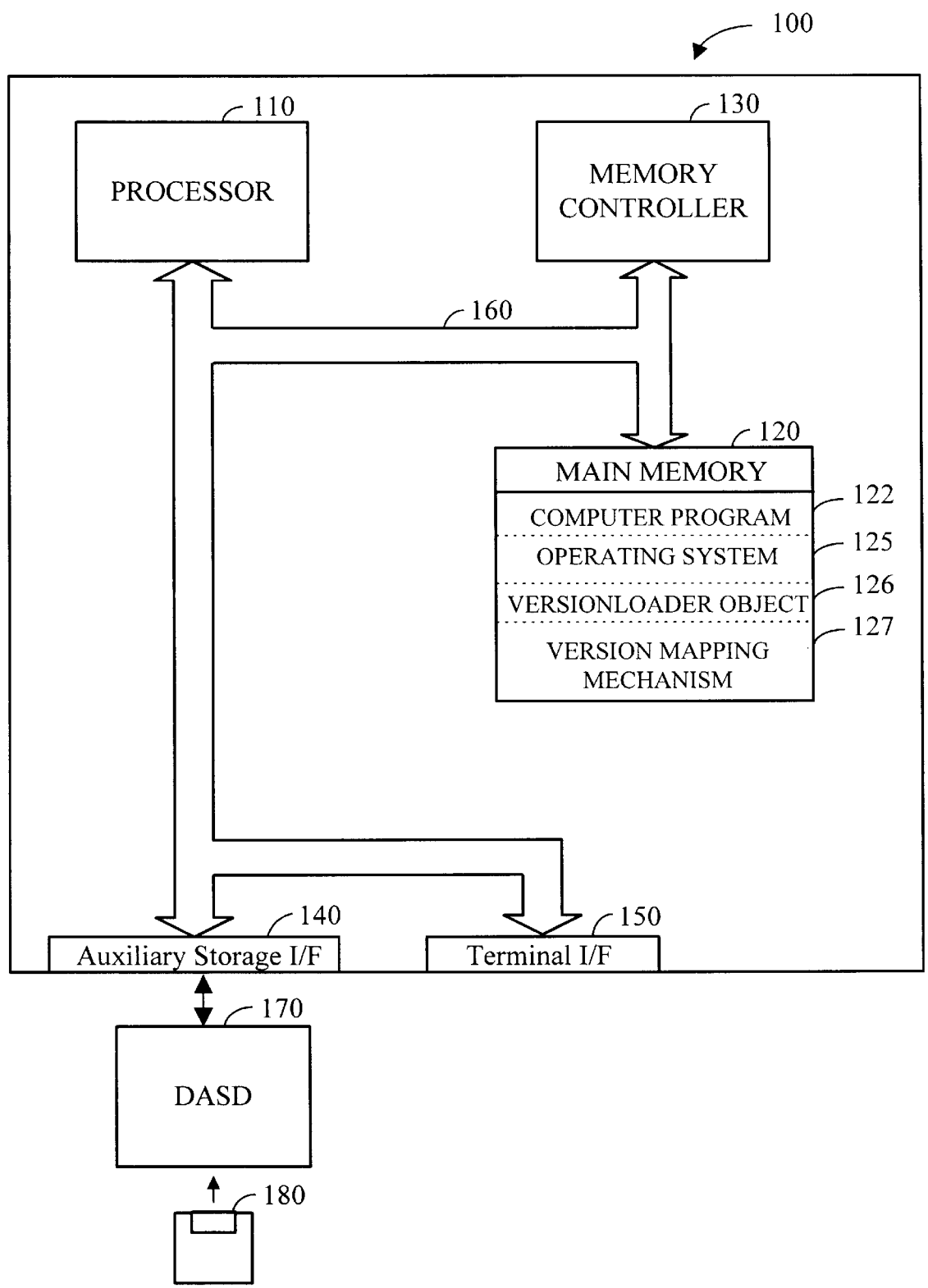
FIG. 1 is a block diagram of an apparatus according to a preferred embodiment of the present invention.

The present invention relates to object-oriented programming techniques. For those individuals who are not generally familiar with object-oriented programming, or the JAVA programming language in particular, the Overview section below presents many of the basic concepts and terminology that will help to understand the invention. Individuals skilled in the art of object-oriented programming may wish to skip this section and proceed directly to the Detailed Description section of this specification.

1. Overview

Object-Oriented Technology v. Procedural Technology

Object-oriented programming is a method of program implementation in which programs are organized as cooperative collections of objects, each of which represents an instance of some class, and whose classes are all members of a hierarchy of classes united via inheritance relationships. Object-oriented programming differs from standard procedural programming in that it uses objects, not algorithms, as the fundamental building blocks for creating computer programs. This difference stems from the fact that the design focus of object-oriented programming technology is wholly different than that of procedural programming technology.

The focus of procedural-based design is on the overall process used to solve the problem; whereas the focus of object-oriented design is on casting the problem as a set of autonomous entities that can work together to provide a solution. The autonomous entities of object-oriented technology are, of course, objects. Object-oriented technology is significantly different from procedural technology because problems are broken down into sets of cooperating objects instead of into hierarchies of nested computer programs or procedures.

Thus, a pure object-oriented program is made up of code entities called objects. Each object is an identifiable, encapsulated piece of code and data that provides one or more services when requested by a client. Conceptually, an object has two parts, an external object interface and internal object implementation. In particular, all object implementation functions are encapsulated by the object interface such that other objects must communicate with that object through its object interface. The only way to retrieve, process or otherwise operate on the object is through the methods defined on the object. This protects the internal data portion of the object from outside tampering. Additionally, because outside objects have no access to the internal implementation, that internal implementation can change without affecting other aspects of the program.

In this way, the object system isolates the requester of services (client objects) from the providers of services (server objects) by a well defined encapsulating interface. In the classic object model, a client object sends request messages to server objects to perform any necessary or desired function. The message identifies a specific method to be performed by the server object, and also supplies any required parameters. The server object receives and interprets the message, and can then decide what service to perform.

There are many computer languages available today that support object-oriented programming. For example, Smalltalk, Object Pascal, C++ and JAVA are all examples of languages that support object-oriented programming to one degree or another.

JAVA Programming Language

JAVA is a modern object-oriented programming language designed by Sun Microsystems that has grown in popularity in recent years. JAVA offers many features and advantages that makes it a desirable programming language to use. First, JAVA is specifically designed to create small application programs, commonly called "applets," that can reside on the network in centralized servers, and which are delivered to the client machine only when needed. Second, JAVA is completely platform independent. A JAVA program can be written once and can then run on any type of platform that contains a JAVA Virtual Machine (JVM). The JVM model is supported by most computer vendors, thereby allowing a software vendor to have access to hardware and software systems produced by many different companies. Finally, JAVA is an object-oriented language, meaning that software written in JAVA can take advantage of the benefits of object-oriented programming techniques. As in other object-oriented systems, operations in JAVA are performed by one object calling a method on another object. These objects can reside locally on the same machine or on separate JVM's physically located on separate computers or systems.

2. Detailed Description

To implement a system according to a preferred embodiment of the present invention, the JVM uses a special class loader object (VersionLoader), which is an object belonging to the java.lang.ClassLoader subclass, to load class files. The primary method of the VersionLoader class is loadClass( ). The JVM passes the name of the desired class as a parameter to the VersionLoader object via the loadClass( ) method and the VersionLoader object will return the newly loaded class. With this class loaded, the desired object can be created. The VersionLoader object can be programmed to map old class names to new class names or to substitute one class name for another class name.

Referring now to FIG. 1, a computer system 100 in accordance with a preferred embodiment of the present invention is an enhanced IBM AS/400 mid-range computer system. However, those skilled in the art will appreciate that the methods and apparatus of the present invention apply equally to any computer system, regardless of whether the computer system is a complicated multi-user computing apparatus or a single user device such as a personal computer or workstation. Computer system 100 suitably comprises a processor 110, main memory 120, a memory controller 130, an auxiliary storage interface 140, and a terminal interface 150, all of which are interconnected via a system bus 160. Note that various modifications, additions, or deletions may be made to computer system 100 illustrated in FIG. 1 within the scope of the present invention such as the addition of cache memory or other peripheral devices. FIG. 1 is presented to simply illustrate some of the salient features of computer system 100.

Processor 110 performs computation and control functions of computer system 100, and comprises a suitable central processing unit (CPU). Processor 110 may comprise a single integrated circuit, such as a microprocessor, or may comprise any suitable number of integrated circuit devices and/or circuit boards working in cooperation to accomplish the functions of a processor. Processor 110 suitably executes an object-oriented computer program 122 within main memory 120.

Auxiliary storage interface 140 allows computer system 100 to store and retrieve information from auxiliary storage devices, such as magnetic disk (e.g., hard disks or floppy diskettes) or optical storage devices (e.g., CD-ROM). One suitable storage device is a direct access storage device (DASD) 170. As shown in FIG. 1, DASD 170 may be a floppy disk drive which may read programs and data from a floppy disk 180. It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include: recordable type media such as floppy disks (e.g., disk 180) and CD ROMS, and transmission type media such as digital and analog communication links, including wireless communication links.

Memory controller 130, through use of a processor (not shown) separate from processor 110, is responsible for moving requested information from main memory 120 and/or through auxiliary storage interface 140 to processor 110. While for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Terminal interface 150 allows system administrators and computer programmers to communicate with computer system 100, normally through programmable workstations. Although the system 100 depicted in FIG. 1 contains only a single main processor 110 and a single system bus 160, it should be understood that the present invention applies equally to computer systems having multiple processors and multiple system buses. Similarly, although the system bus 160 of the preferred embodiment is a typical hardwired, multidrop bus, any connection means that supports bi-directional communication in a computer-related environment could be used.

Main memory 120 suitably contains one or more computer programs 122, an operating system 125, a VersionLoader object 126, and a version mapping mechanism 127. Computer program 122 in memory 120 is used in its broadest sense, and includes any and all forms of computer programs, including source code, intermediate code, machine code, and any other representation of a computer program. VersionLoader object 126 and version mapping mechanism 127 are created and/or manipulated by some portion of computer program 122. The term "memory" as used herein refers to any storage location in the virtual memory space of system 100.

It should be understood that main memory 120 will not necessarily contain all parts of all mechanisms shown. For example, portions of computer program 122 and operating system 125 may be loaded into an instruction cache (not shown) for processor 110 to execute, while other files may well be stored on magnetic or optical disk storage devices (not shown). In addition, although computer program 122 is shown to reside in the same memory location as operating system 125, VersionLoader object 126, and version mapping mechanism 127, it is to be understood that main memory 120 may consist of multiple disparate memory locations.

Referring now to FIG. 2, a sample source code listing 200 for a version mapping mechanism as used in a method in accordance with a preferred embodiment of the present invention is shown. In this example, it is assumed that ibm.as400.Employee$2_0 is the most recent or current standard version of the Employee class. Other older or beta versions of the Employee class may exist on the system but may not be available for use by the users of the system. By using this sample version mapping code, any request for an object belonging to the ibm.as400.Employee class will be mapped to ibm.as400.Employee$2_0 and will yield an object belonging to that class.

Sample code 200, as shown in FIG. 2, highlights the various types of entries (lines 210, 220, 230, 240, and 250) that would be used to handle most typical requests in a system using a class version mapping method according to a preferred embodiment of the present invention. The source code shown on line 220 maps a request for a specific version of an object to another specific version of an object. This type of request, while possible, is not very likely. If a user or client object requests a certain specific version of the class, in most circumstances the class loader should provide the requested class. Lines 210, 230, and 240 are provided for situations where the user does not request a specific version of the desired class. In this case, the user is typically requesting the default version of the class and the class loader will supply the most current production version of the class. This is a more likely type of request for most systems to process on a regular basis. Finally, line 250 provides a mapping function which returns an object which belongs to a class with a completely different name than the name of the requested class. This is especially important for any client request that may involve sub-classes. For example, a client object may request a new object from the Employee class and the created object may actually belong to a sub-class (i.e., IBMEmployee) of the Employee class. Although one version mapping mechanism in this example, many alternative embodiments are available for implementing a version mapping mechanism.

For example, the VersionLoader object could be implemented to change the class version "on the fly" by altering the class file (the class file is the compiled version or object code version of the java source code). In this scenario, when the VersionLoader object reads in the requested class file, the VersionLoader object modifies the class name constants within the bytes of the class file name of the class version and passes the modified class file on to the JVM. Different VersionLoader objects could be provided with a system wherein each different VersionLoader object implements a different class versioning policy. When a system is first installed, a specific VersionLoader object could be selected from all of the various possibilities, with the selected VersionLoader implementing and supporting the desired versioning policy.

Alternatively, versioning support for different class versions could be implemented by adopting a series of different user interfaces as a version mapping mechanism. In this implementation, each user interface would have a specific VersionLoader associated with it and when the user "binds" to an interface, the user will inherently be selecting the corresponding VersionLoader. Each VersionLoader maps requested class versions to the desired class versions according to the predetermined versioning policy in place for the system. For example, if a user is using Interface 1, then VersionLoader object 1 will be used to select and load class versions for the user. Depending on the policy decisions embodied in the version mapping mechanism used by VersionLoader object 1, various class versions can be mapped as previously explained above. Alternatively, if a user is using Interface 2, then VersionLoader object 2 will be used to interface with version mapping mechanism 2 and the classes will be mapped, selected, and loaded accordingly. It is important to note that version mapping mechanism 1 and version mapping mechanism 2 may or may not map the same requested classes in the same way. Additionally, the version mapping mechanisms can be updated as necessary without changing the user interface.

Other possible solutions to the version naming problem identified above might actually utilize the name of the class as a mechanism to track and identify the various class versions. For example, using one name-related approach, the class name for each new version of the class would incorporate the class version number and/or the release number as an integral part of the class name, i.e., ibm.as400.Employee$1_0, ibm.as400.Employee$1_1, ibm.as400.Employee$2_0, etc.

Alternatively, another name-related approach to versioning would be to include the class version name or class descriptor as an integral part of the existing JAVA package name, i.e., ibm.as400.Ver1_0.Employee, ibm.as400.Ver1_1.Employee, or ibm.as400.Ver2_0.Employee.

Finally, another possible name-related solution might implement an enhancement to the JAVA language itself, by adding an optional extension to the existing object name to identify the class version, i.e., ibm.as400.Employee:1_0. The problems with the first two of these name-related methods described above is that the user must be aware of the fact that different versions of the various employee classes exist and that they must know which version is appropriate for the task to be performed. In order to implement the final name-related method, specific changes to the existing JAVA language environment and model must be adopted as new standards.

Figure 3:
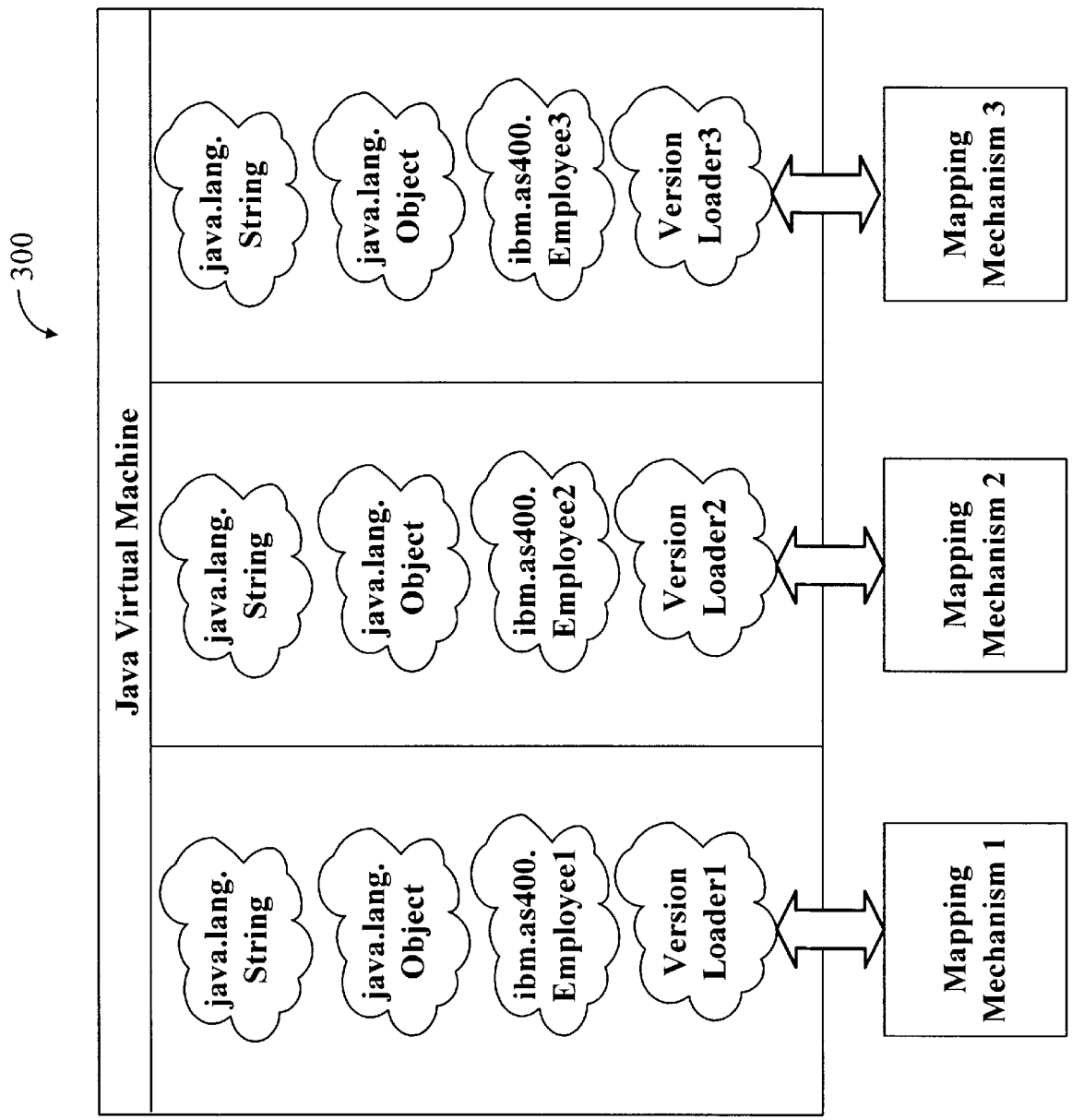
FIG. 3 is a block diagram of a JAVA Virtual Machine using multiple classLoaders according to a preferred embodiment of the present invention.

Referring now to FIG. 3, a JVM which supports multiple concurrent versions of a class according to a preferred embodiment of the present invention is shown. In this embodiment, class versioning can be supported by using a series of VersionLoader objects. This allows a JVM to simultaneously support multiple versions of a class by correlating each of the various VersionLoader objects with a different version of the class. When a user enters the system, they select a given VersionLoader object and, if desired, a different version mapping mechanism will be accessed by the user and will, in turn, provide a desired outcome for the various requests for different class versions.

Figure 4:
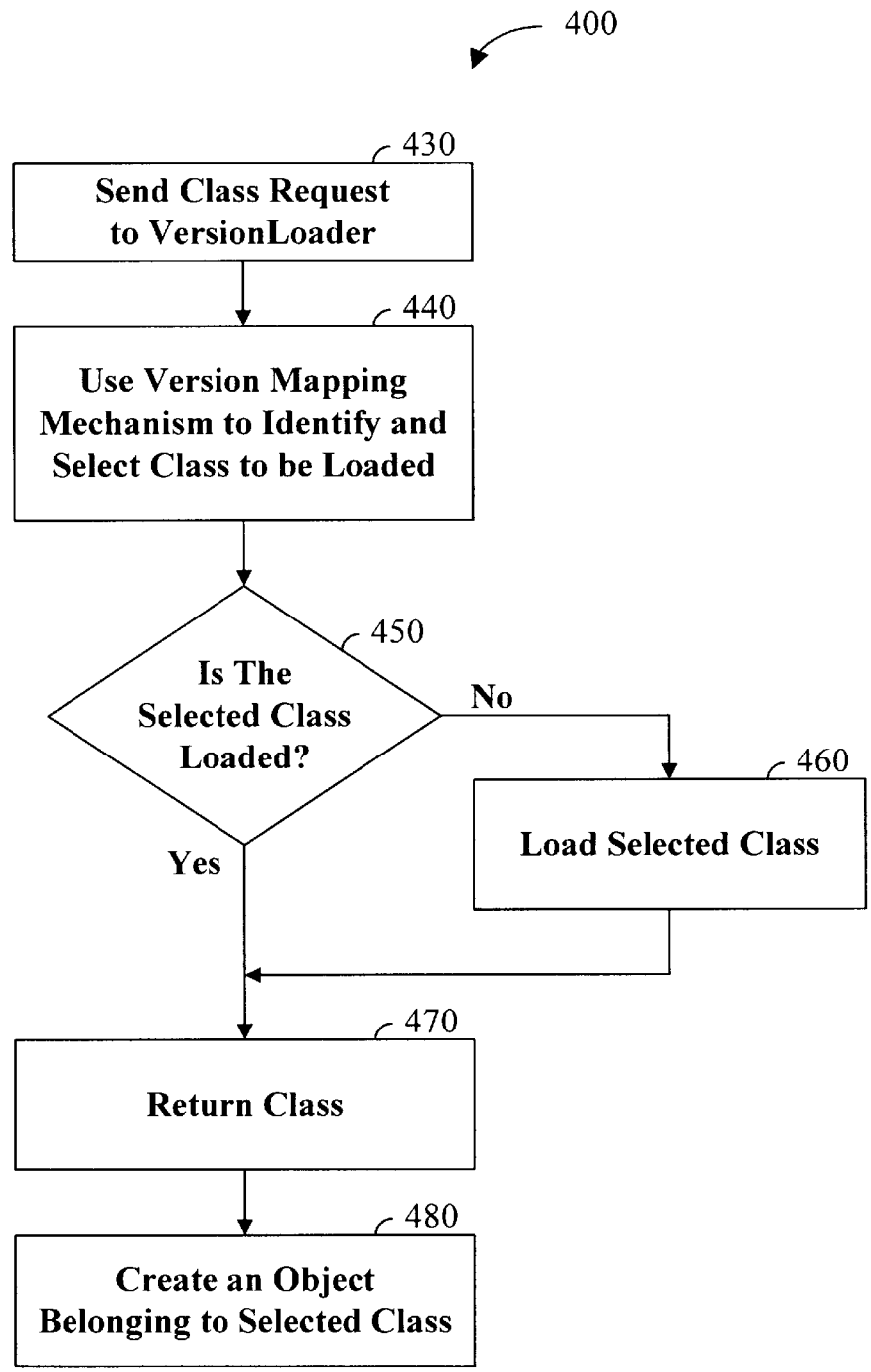
FIG. 4 is a flow diagram of a class selection and loading method according to a preferred embodiment of the present invention.

Referring now to FIG. 4, a method 400 according to a preferred embodiment of the present invention is illustrated. As shown in method 400, whenever a request for a new object is received, a class must be loaded to support that request. As shown in FIG. 4, the request for a class will be sent to the VersionLoader object (step 430). In response to the request, the VersionLoader object will use a version mapping mechanism to select a class that should be loaded (step 440). It is important to note that the selected class may or may not be the same as the requested class. All of the possibilities described above may be implemented in the versioning policy supported by the version mapping mechanism. The selected class may be a subclass of the requested class or, alternatively, may be totally unrelated to the requested class by class inheritance. The VersionLoader object will then check to see if the selected class is already loaded. If the selected class is already loaded (step 450= YES), the VersionLoader object will return the selected class for use by the JVM. If however, the selected class is not loaded (step 450=NO), the selected class is loaded (step 460) and returned from the VersionLoader object (step 470) for use by the JVM. In either case, the JVM can then create an object belonging to the loaded class (step 480).

Referring now to FIGS. 1, 2, 3, and 4, computer program 122 uses VersionLoader object 126 to load class data from a memory location somewhere in the virtual memory space of the system 100. VersionLoader object 126 is a special implementation or a sub-class of the classLoader class that loads necessary data regarding the various requested classes so that new objects can be created. Whenever a new object is requested, VersionLoader object 126 will use version mapping mechanism 127 to select the appropriate class to load to support creation of the requested object. By using a VersionLoader object 126 according to a preferred embodiment of the present invention, the desired relationship between requested classes and selected classes can be configured and reconfigured quickly and easily, as necessary.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims.

We claim:

1. An apparatus comprising:
    a CPU coupled to a bus;
    a memory coupled to the bus;
    a version mapping mechanism residing in the memory, the version mapping mechanism including a mapping of classes to preferred class versions; and
    a version loader object residing in the memory, wherein the version loader object, in response to a request to load a requested class, checks the version mapping mechanism to determine a preferred version of the requested class and then loads the preferred version of the requested class.

2. The apparatus of claim 1 wherein the requested class is a default class.

3. The apparatus of claim 1 wherein the preferred version of the requested class is a subclass of the requested class.

4. The apparatus of claim 1 wherein the preferred version of the requested class is unrelated by inheritance to the requested class.

5. The apparatus of claim 1 wherein the version mapping mechanism comprises a mapping file.

6. The apparatus of claim 1 wherein the version mapping mechanism comprises an algorithm stored in the memory.

7. The apparatus of claim 1 wherein the preferred version of the requested class is the requested class.

8. The apparatus of claim 1 wherein the preferred version of the requested class is not the requested class.

9. A method of providing versioning for classes in an object-oriented environment, the method comprising the steps of:
    sending a request for a requested class to a version loader object;
    the version loader object checking a version mapping mechanism to determine a preferred version of the requested class, the version mapping mechanism including a mapping of classes to preferred class versions; and
    the version loader object loading the preferred class version of the requested class.

10. The method of claim 9 wherein the requested class is a default class.

11. The method of claim 9 wherein the preferred version of the requested class is a subclass of the requested class.

12. The method of claim 9 wherein the preferred version of the requested class is unrelated by inheritance to the requested class.

13. The method of claim 9 wherein the version mapping mechanism comprises a mapping file.

14. The method of claim 9 wherein the version mapping mechanism comprises an algorithm.

15. The method of claim 9 wherein the preferred version of the requested class is the requested class.

16. The method of claim 9 wherein the preferred version of the requested class is not the requested class.

17. A program product comprising:
    a version loader object that, in response to a request to load a requested class, checks a version mapping mechanism comprising a mapping of classes to preferred class versions to determine a preferred version of the requested class and then loads the preferred version of the requested class; and
    signal bearing media bearing the version loader object.

18. The program product of claim 17 wherein the requested class is a default class.

19. The program product of claim 17 wherein the preferred version of the requested class is a subclass of the requested class.

20. The program product of claim 17 wherein the preferred version of the requested class is unrelated by inheritance to the requested class.

21. The program product of claim 17 wherein the preferred version of the requested class is the requested class.

22. The program product of claim 17 wherein the preferred version of the requested class is not the requested class.

23. The program product of claim 17 wherein the signal bearing media comprises recordable media.

24. The program product of claim 17 wherein the signal bearing media comprises transmission media.

25. The program product of claim 17 wherein the version mapping mechanism comprises a mapping file stored in a memory.

26. The program product of claim 17 wherein the version mapping mechanism comprises an algorithm stored in a memory.

27. An apparatus, the apparatus comprising:
    a CPU coupled to a bus;
    a memory coupled to the bus;
    a plurality of version mapping mechanisms residing in the memory, each version mapping mechanism including a mapping of classes to preferred class versions; and
    a plurality of version loader objects residing in the memory, wherein each of the plurality of version loader objects, in response to a request to load a requested class, checks a different version mapping mechanism to determine a preferred version of the requested class and then loads the preferred version of the requested class.

28. The apparatus of claim 27 wherein the requested class is a default class.

29. The apparatus of claim 27 wherein the preferred version of the requested class selected is a subclass of the requested class.

30. The apparatus of claim 27 wherein the preferred version of the requested class is unrelated by inheritance to the requested class.

31. The apparatus of claim 27 wherein the preferred version of the requested class is the requested class.

32. The apparatus of claim 27 wherein the preferred version of the requested class is not the requested class.

33. An apparatus, the apparatus comprising:
    a CPU coupled to a bus;
    a memory coupled to the bus;

a plurality of user interfaces residing in the memory;

a plurality of version mapping mechanisms residing in the memory each version mapping mechanism including a mapping of classes to preferred class versions;

a plurality of class loader objects residing in the memory; and wherein each of the plurality of user interfaces, in response to a request to load a requested class, checks a different version mapping mechanism to determine a preferred version of the requested class and then loads the preferred version of the requested class.

34. The apparatus of claim 33 wherein the requested class is the default class.

35. The apparatus of claim 33 wherein the preferred version of the requested class is a subclass of the requested class.

36. The apparatus of claim 33 wherein the preferred version of the requested class is unrelated by inheritance to the requested class.

37. A JAVA virtual machine apparatus for implementing class versioning and naming, the apparatus comprising:

a CPU coupled to a bus;

a memory coupled to the bus;

a JAVA virtual machine residing in the memory;

a plurality of class versions residing in the memory;

a plurality of version mapping mechanisms residing in the memory, each version mapping mechanism including a mapping of classes to preferred class versions;

a plurality of class loader objects residing in the memory; and wherein each of the plurality of class loader objects, in response to a request to load a requested class, checks a different version mapping mechanism to determine a preferred version of the requested class and then loads the preferred version of the requested class.

38. An apparatus, the apparatus comprising:

a CPU coupled to a bus;

a memory coupled to the bus;

a JAVA class file residing in the memory, the JAVA class file having a name;

a version mapping mechanism residing in the memory, the version mapping mechanism including a mapping of classes to preferred class versions and their names;

a class loader object residing in the memory; and wherein the class loader object, in response to a request to load a requested JAVA class, checks the version mapping mechanism to determine a preferred version of the requested JAVA class, modifies the name of the preferred JAVA class file to the name the requested JAVA class, and then loads the preferred version of the requested JAVA class.

39. The apparatus of claim 38 wherein the requested JAVA class is a default class.

40. The apparatus of claim 38 wherein the preferred version of the requested JAVA class is a subclass of the requested class.

41. A class versioning and naming apparatus, the apparatus comprising:

a CPU coupled to a bus;

a memory coupled to the bus;

a plurality of JAVA packages residing in the memory; each of the plurality of JAVA packages having a JAVA package name;

a version mapping mechanism residing in the memory, the version mapping mechanism including a mapping of classes to preferred class versions and their names;

a version loader object residing in the memory;

wherein the JAVA package name for each of the plurality of JAVA packages has a different class version identifier included in the JAVA package name, wherein the version loader object uses the class version identifier included in the JAVA package name to identify the class version of the JAVA package, and wherein in response to a request to load a requested JAVA class, the version loader object checks the version mapping mechanism using the version class identifier to determine a preferred version of the requested JAVA class, then loads the preferred version of the requested JAVA class.

* * * * *